US011609923B2

(12) United States Patent
Seyfert et al.

(10) Patent No.: US 11,609,923 B2
(45) Date of Patent: *Mar. 21, 2023

(54) SEARCH ACROSS MULTIPLE USER INTERFACES

(71) Applicant: YAHOO ASSETS LLC, Dulles, VA (US)

(72) Inventors: Friedhold Alexander Seyfert, San Francisco, CA (US); Laxmi Milind Phalak, Aundh (IN); Murali Krishna Bachhu, Sunnyvale, CA (US); Prasad Thondamuthur Vasanth, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/786,961

(22) Filed: Feb. 10, 2020

(65) Prior Publication Data

US 2020/0175014 A1 Jun. 4, 2020

Related U.S. Application Data

(63) Continuation of application No. 15/163,224, filed on May 24, 2016, now Pat. No. 10,558,676.

(51) Int. Cl.
*G06F 16/24* (2019.01)
*G06F 16/2458* (2019.01)
*H04L 51/52* (2022.01)
*H04L 51/18* (2022.01)

(52) U.S. Cl.
CPC .......... *G06F 16/2471* (2019.01); *H04L 51/52* (2022.05); *H04L 51/18* (2013.01)

(58) Field of Classification Search
CPC ...... G06F 16/2471; H04L 51/32; H04L 51/18
See application file for complete search history.

(56) References Cited

U.S. PATENT DOCUMENTS

2015/0058318 A1* 2/2015 Blackwell ........... G06F 16/9535
707/722

* cited by examiner

*Primary Examiner* — Truong V Vo
(74) *Attorney, Agent, or Firm* — Cooper Legal Group LLC (57) ABSTRACT

One or more computing devices, systems, and/or methods for searching across multiple user interfaces are provided. For example, a search query may be received from a user of a computing environment. A set of user interfaces, hosted by the computing environment, may be identified (e.g., mobile apps of a mobile operating system, browser tabs of a web browser, etc.). Content within the set of user interfaces may be queried using the search query to identify search results of the search query (e.g., webpages, social network posts, emails, or other content matching the search query). In an example, cached content of the user interfaces (e.g., recently accessed emails cached within a local content buffer cache by the web browser) may be searched using the search query for efficient querying of relevant content, such as through local or offline querying. The search results may be provided to the user.

20 Claims, 9 Drawing Sheets

SEARCH ACROSS MULTIPLE USER INTERFACES

RELATED APPLICATION

This application claims priority to and is a continuation of U.S. application Ser. No. 15/163,224, filed on May 24, 2016, entitled "SEARCH ACROSS MULTIPLE USER INTERFACES", which is incorporated by reference herein in its entirety.

BACKGROUND

Many computing environments are capable of hosting multiple user interfaces. In an example, a mobile operating system of a mobile device (e.g., a tablet, a wearable device, a smart phone, etc.) may allow a user to execute and/or switch between various mobile apps. For example, the user may open an email app to read an email, switch from the email app to a home screen, open a videogame review app from the home screen, and then transition from the videogame review app to the email app for composing a new email. In another example, a web browser may allow a user to open multiple webpages within browser tabs. For example, the user may open a news webpage in a first browser tab, and then open a banking webpage in a second browser tab. The user may open new browser tabs, close browser tabs, and/or navigate between browser tabs. In this way, a user's capability to multitask may be vastly improved.

When performing a task or switching between tasks, the user may switch between user interfaces comprising information relevant to the task. Unfortunately, the user's workflow may become interrupted when the user has to switch between a large set of user interfaces and/or search within interfaces for relevant information. For example, the user may have 35 browser tabs open when attempting to compose an email about purchasing a new car. The user may switch to a first browser tab to access an email webpage for composing the email. The user may manually search amongst the 35 browser tabs for a browser tab with a car review webpage, and then switch to that browser tab to access the car review webpage. The user may then manually search amongst the 35 browser tabs for a browser tab with an email inbox comprising hundreds of emails, and then switch to that browser tab to manually search the email inbox for a dealership quote email. The user may switch back to the first browser tab to continue composing the email. The user may perform many more manual switches and/or searches while collecting relevant information for composing the email, such as switching to a browser tab to manually search a social network webpage for a social network post about a car. However, the user may be unable to search cross multiple user interfaces, such as the browser tabs, through a single search command to efficiently and quickly locate relevant information.

SUMMARY

In accordance with the present disclosure, one or more computing devices and/or methods for searching across multiple user interfaces are provided. In an example, a search query may be received from a user of a computing environment (e.g., a user may search for "Times Square"). A set of user interfaces hosted by the computing environment may be identified (e.g., browser tab user interfaces of a browser computing environment such as a web browser, mobile apps of a mobile operating system computing environment, executing applications of a desktop operating system computing environment, user interfaces with content that is locally cached, etc.). Content within the user interfaces (e.g., locally cached content within a local content buffer cache; content within memory of a local device hosting the user interface; content populated within a user interface; etc.) may be searched using the search query to identify search results for the search query. For example, the search results may comprise a vacation email within an email inbox populated within a first web browser tab, a social network post about New York populated within a social network app, and a personal budget entry within a spreadsheet app. In this way, the search results may be provided to the user. For example, a search result interface may be populated with content links that link to each search result. Responsive to the user selecting a content link, the computing environment may be transitioned to a corresponding user interface populated with content that is linked to by the content link. Various navigational controls may be provided so that the user can easily switch between search results, the search result interface, and/or distinguish between user interfaces comprising search results and user interfaces not comprising search results. In this way, the user may use a single search command to search content of multiple user interfaces.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
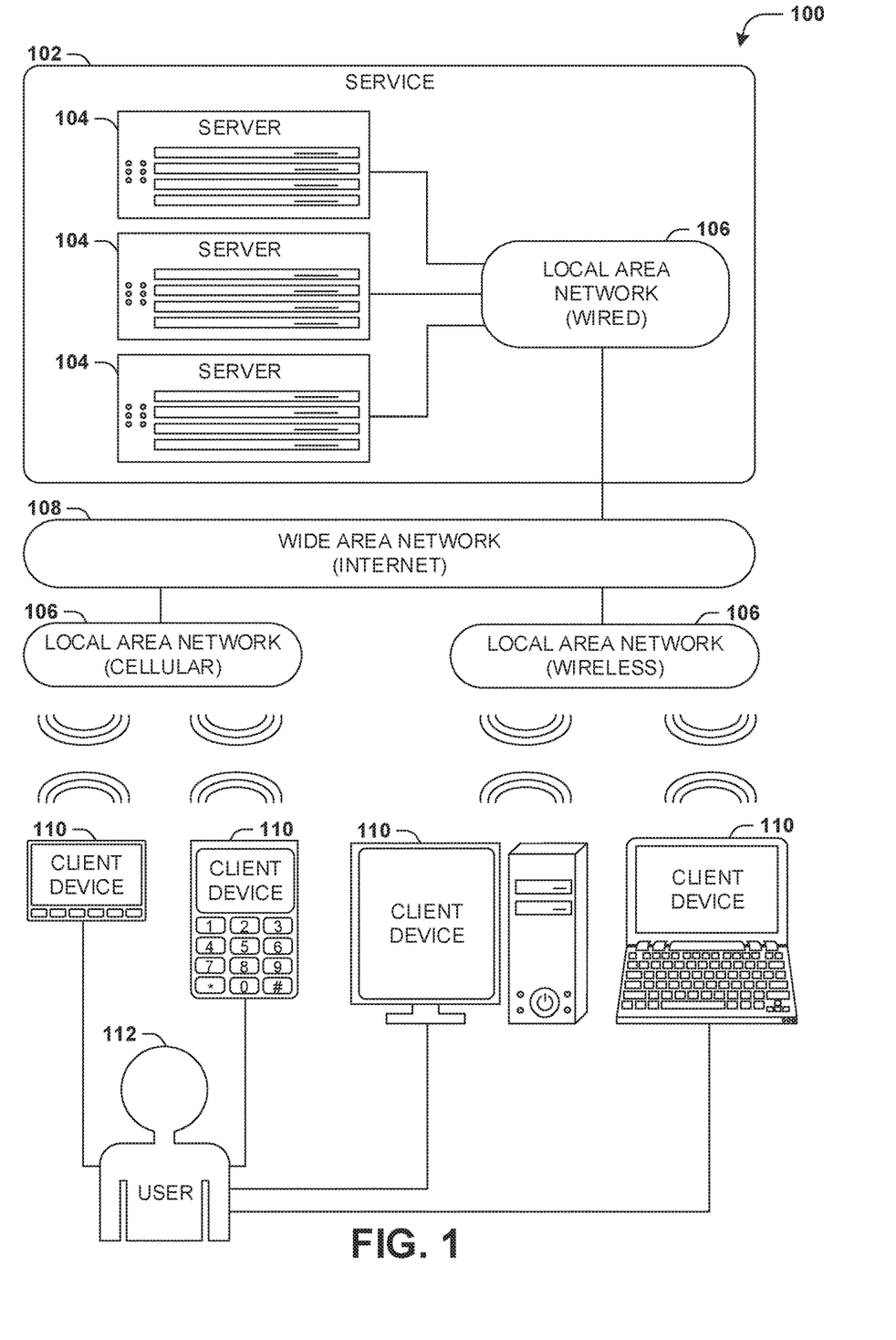
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
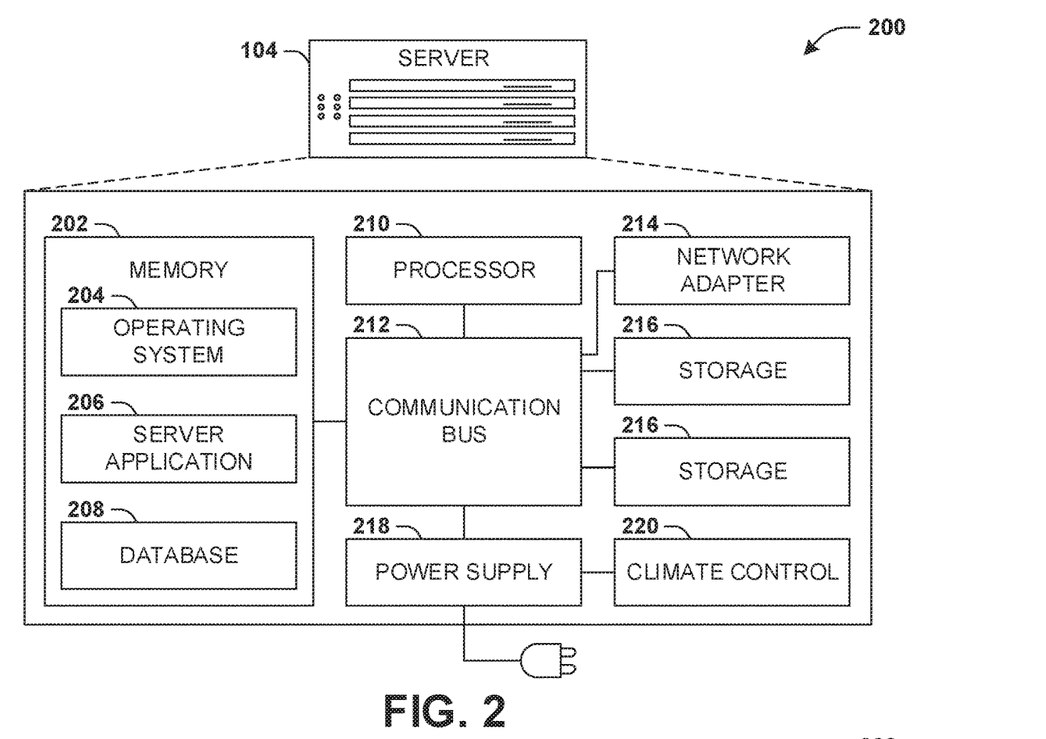
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
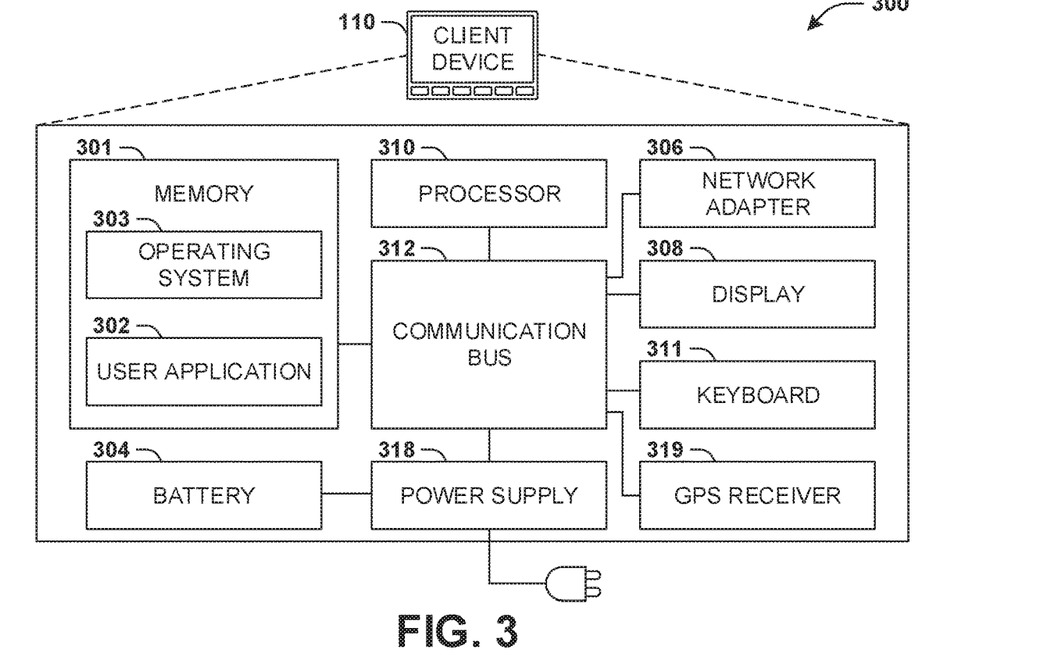
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for searching across multiple user interfaces are provided. A user may access information through a plurality of user interfaces, such as browser tab user interfaces, mobile apps, desktop applications, etc. The user may switch between user interfaces, such as when performing a task (e.g., switching between a shopping website, a consumer goods review app, an email inbox, a calendar app, etc. while shopping for holiday presents). Unfortunately, switching between user interfaces and manually searching individual user interfaces for relevant information may be cumbersome, time consuming, and waste resources.

Accordingly, as provided herein, the user may search across multiple user interfaces (e.g., using a single search command) to efficiently identify relevant information in a quick and less resource intensive way. In this way, the user can quickly locate relevant content amongst a plurality of user interfaces without wasting time and/or computing resources manually searching individual user interfaces for such content. In an example, locally cached content (e.g., cached webpages, cached emails, mobile app data stored within memory, etc.) may be searched because such content may be more contextually relevant to the user and/or efficiently accessed for searching (e.g., as opposed to searching a large number of emails within an email inbox and/or querying a remote content provider over a network, which may waste network bandwidth and computing resources by searching through old irrelevant emails compared to merely searching cached emails such as recently accessed emails that may be more contextually relevant). Searching a local content buffer cache may decrease network bandwidth usage, battery consumption, computing resource consumption, and/or latency otherwise introduced by accessing remote content providers hosting the content (e.g., local memory may be search for locally cached emails without accessing a remote email server). In an example of searching content within multiple browser tab user interfaces, content within the multiple browser tab user interfaces (e.g., email body text of an email, text of a news article displayed through a webpage, an attachment to an email, etc.) may be searched, as opposed to merely titles of the browser tab user interfaces being search, which may provide a finer granularity of search results.

Figure 4:
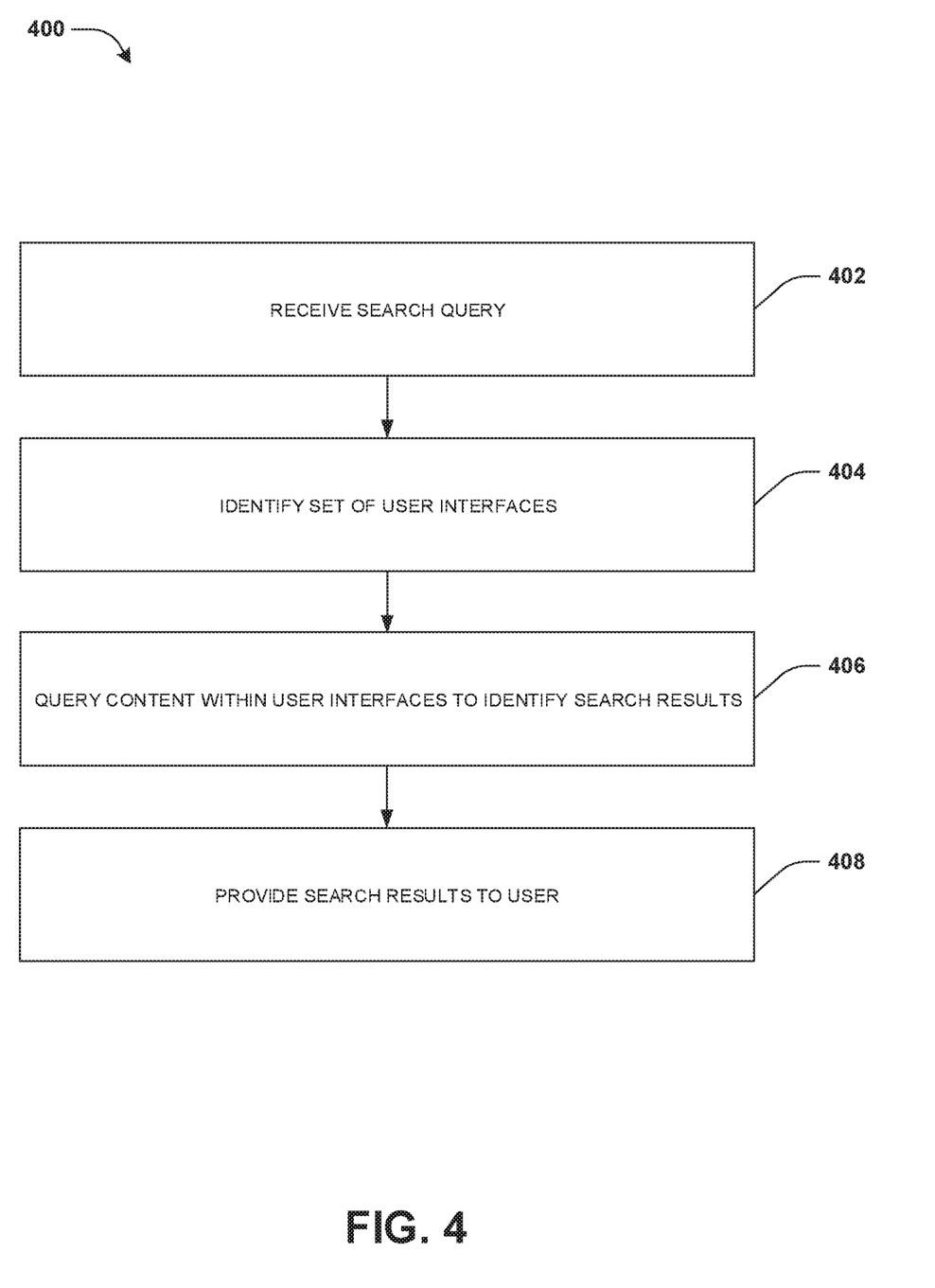
FIG. 4 is a flow chart illustrating an example method for searching across multiple user interfaces.

An embodiment of searching content across multiple user interfaces is illustrated by an example method 400 of FIG. 4. At 402, a search query may be received from a user of a computing environment. For example, the user may input a search query "Florida vacation" into a computing device hosting the computing environment. At 404, a set of user interfaces hosted by the computing environment may be identified. In an example, a mobile operating system computing environment may host mobile app user interfaces comprising app content. In another example, an operating system computing environment may host application user interfaces comprising application content. In another example, a browser computing environment (e.g., a web browser) may host browser tab user interfaces comprising webpage content, emails, etc. For example, the set of user interfaces may comprise a first browser tab user interface populated with a personal email inbox, a second browser tab user interface populated with a shopping email, a third browser tab user interface populated with a vacation email, a fourth browser tab user interface populated with a work email inbox, a fifth browser tab user interface populated with a Florida events newsletter email, etc.

At 406, content, within user interfaces of the set of user interfaces (e.g., cached content of the user interfaces), may be queried using the search query to identify search results for the search query. In an example, content, populated within the browser tab user interfaces, may be queried using the search query to determine whether such content is a search result. For example, email content within the personal email inbox of the first browser tab user interface may be searched using the search query "Florida vacation" to determine that 3 personal emails within the personal email inbox are search results matching the search query "Florida vacation" (e.g., merely recently accessed emails that have been cached may be queried to improve performance). Email content within the shopping email (e.g., email body text, an email attachment, etc.) of the second browser tab user interface may be searched using the search query "Florida vacation" to determine that the shopping email is not a search result matching the search query "Florida vacation". Email content within the vacation email (e.g., email body text, an email attachment, etc.) of the third browser tab user interface may be searched using the search query "Florida vacation" to determine that the vacation email is a search result matching the search query "Florida vacation". Email content within the work email inbox of the fourth browser tab user interface may be searched using the search query "Florida vacation" to determine that no work emails within the work email inbox are search results matching the search query "Florida vacation" (e.g., merely recently accessed emails that have been cached may be queried to improve performance). Email content within the Florida events newsletter email (e.g., email body text, an email attachment, etc.) of the fifth browser tab user interface may be searched using the search query "Florida vacation" to determine that the Florida events newsletter email is a search result matching the search query "Florida vacation".

In an example of querying the content, locally cached emails, cached by the plurality of browser tab user interfaces that are populated with email content that were received from one or more remote email content providers, may be queried. In this way, the performance of the query may be improved and network bandwidth may be reduced along with battery consumption because the query does not need to access the one or more remote email content providers such as over a network.

In another example of querying the content, a local content buffer cache may be queried to identify a set of cached content eligible for being queried (e.g., mobile apps, webpages, etc. may locally store/cache content within memory). The set of cached content may be queried using the search query to identify the search results. In an example, an offline query may be performed to the local content buffer cache while the computing device is offline (e.g., not connected to a network accessible to a remote content provider that initially provided the content to the computing device). For example, cached content, received from remote content providers (e.g., emails from an email server, social network posts from a social network service, or other content cached within memory) and/or locally stored content (e.g., content stored within the computing device) may be queried using a local content query without accessing the remote content providers (e.g., while a remote content provider is inaccessible to the computing environment).

At 408, the search results may be provided to the user. In an example of providing the search results, a subset of user interfaces, comprising content corresponding to the search query (e.g., comprising search results), may be identified. A second subset of user interfaces, not comprising content corresponding to the search query, may be identified. The subset of user interfaces, but not the second subset of interfaces, may be displayed to the user (e.g., the first browser tab user interface of the personal email inbox, the third browser tab user interface of the vacation email, and the fifth browser tab user interface of the Florida events newsletter email may be displayed, while the second browser tab user interface of the shopping email and the fourth browser tab user interface of the work email inbox may not be displayed (e.g., hidden).

In another example of providing the search results, a search result interface, populated with content links to search results, may be displayed. For example, a first content link may link to a first personal email, within the personal email inbox, that was identified as a search result. A second content link may link to a second personal email, within the personal email inbox, that was identified as a search result. A third content link may link to a third personal email, within the personal email inbox, that was identified as a search result. A fourth content link may link to the vacation email within the third browser tab user interface. A fifth content link that may link to the Florida events newsletter email within the fifth browser tab user interface. Responsive to the user selecting a content link, the computing environment may be transitioned to a user interface comprising content linked to by the content link. For example, responsive to the user selecting the first content link, the computing environment may be transitioned to the first personal email within the personal email inbox populated within the first browser tab user interface. In an example, a focus point (e.g., corresponding to a visual center point of a display of the computing device or a visual center point of the user interface) may be anchored upon a portion of the content matching the search query (e.g., instead of merely displaying the personal email inbox where the first personal email may be scrolled out of view, the first personal email may be displayed within a prominent location such as the visual center point of the display or of the first browser tab user interface). In an example, a display property of the portion of the content matching the search query may be modified (e.g., the first personal email may be highlighted, bolded, outlined, etc.). Responsive to transitioning to the user interface, a return to search result interface link may be provided so that a user may easily navigate between search results and/or the search result interface.

Figure 5A:
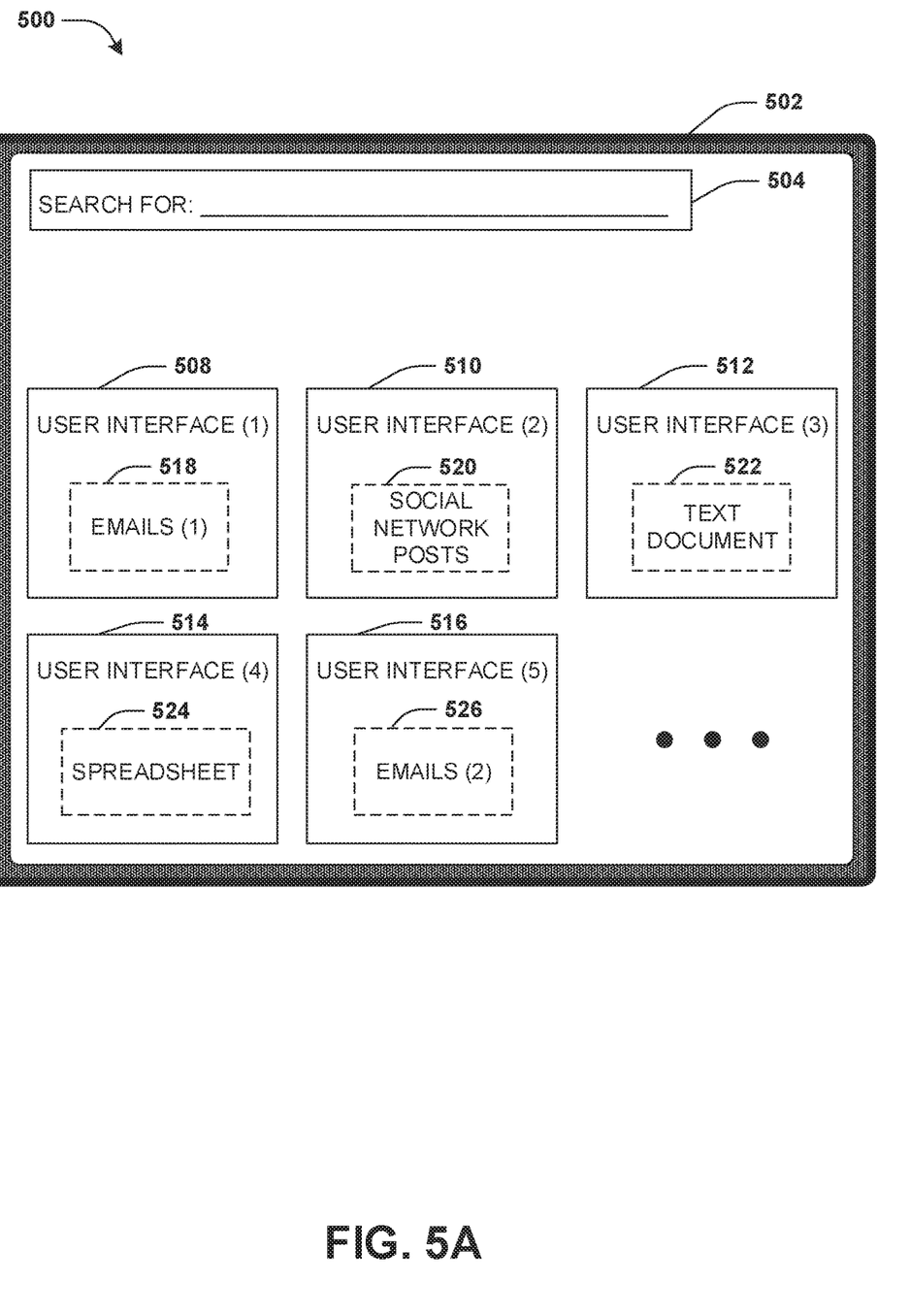
FIG. 5A is a component block diagram illustrating an example system for searching across multiple user interfaces, where a computing environment hosts a plurality of user interfaces.
Figure 5B:
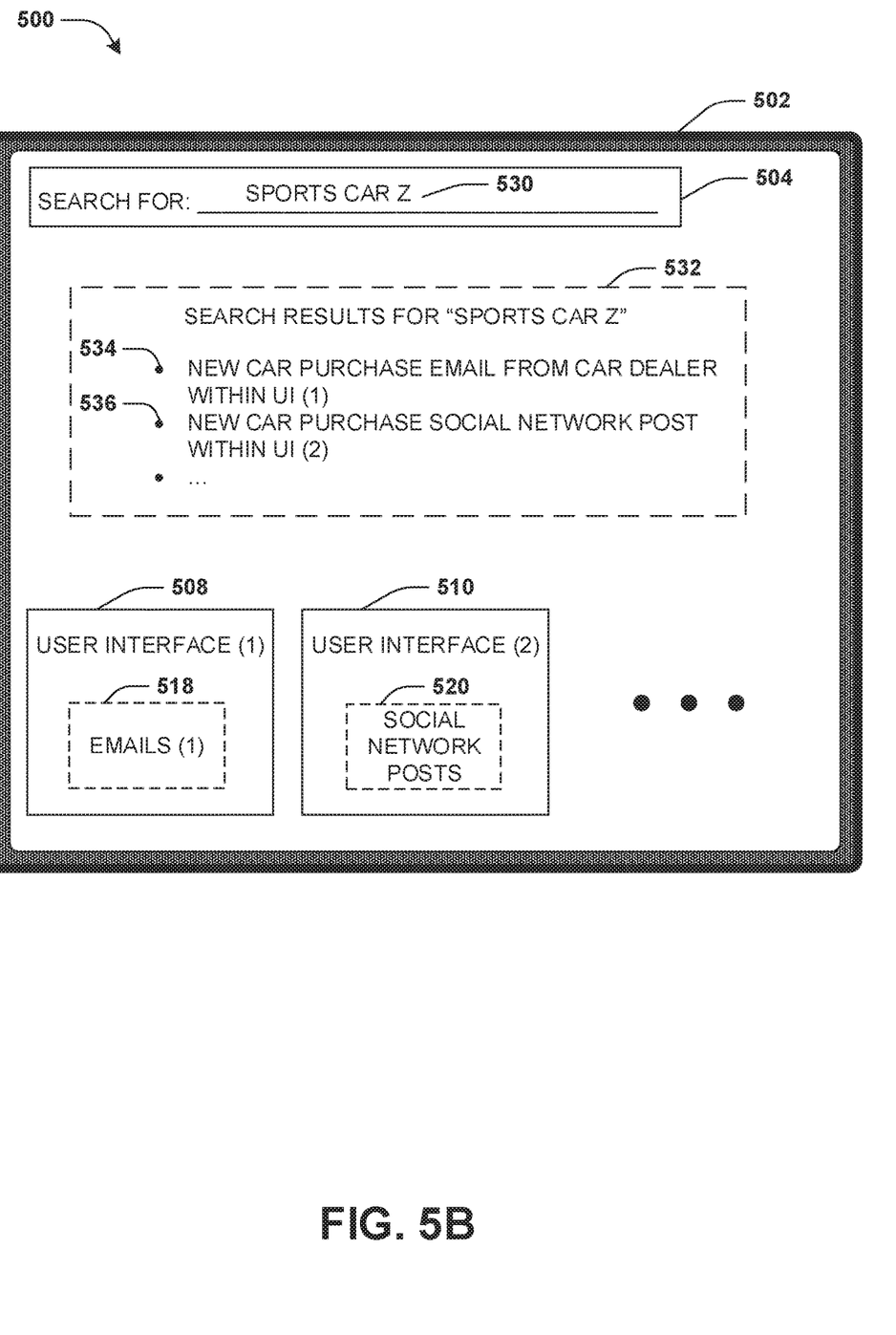
FIG. 5B is a component block diagram illustrating an example system for searching across multiple user interfaces, where search results are provided.
Figure 5C:
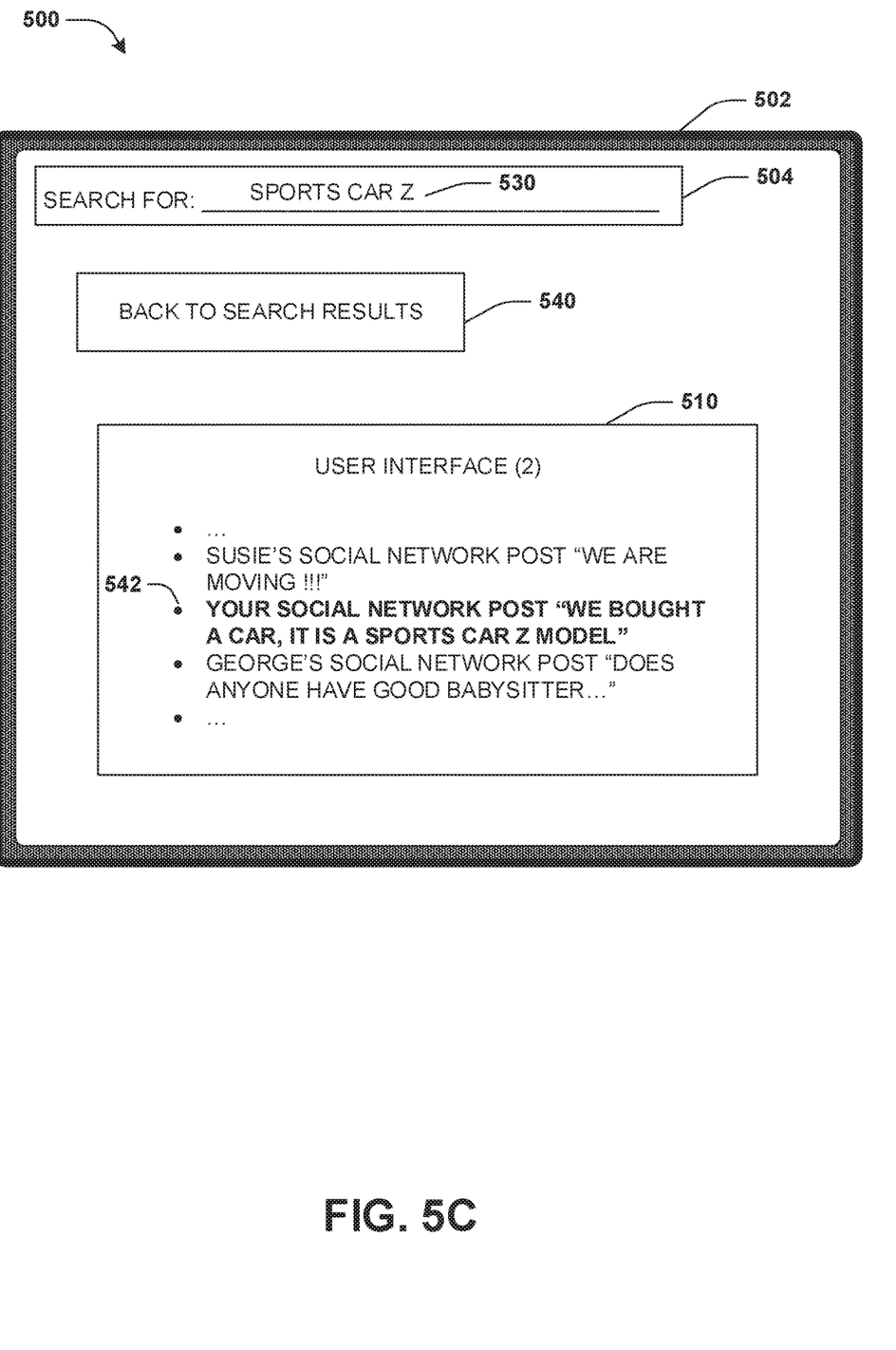
FIG. 5C is a component block diagram illustrating an example system for searching across multiple user interfaces, where a computing environment is transitioned to a user interface comprising a search result.

FIGS. 5A-5C illustrate examples of a system 500 for searching across multiple user interfaces. FIG. 5A illustrates a computing environment of a computing device 502 hosting one or more user interfaces. User interfaces of the one or more user interfaces may be executing, such as actively executing in a foreground visible to a user, actively executing in a background not visible to the user, suspended in the background, or in any other operational, suspended, or closed state. The computing device 502 may host a first user interface 508 populated with a first set of emails 518, a second user interface 510 populated with social network posts 520, a third user interface 512 populated with a text document 522, a fourth user interface 514 populated with a spreadsheet 524, a fifth user interface 516 populated with a second set of emails 526, etc. In an example, the user may be performing car purchase comparison task using the spreadsheet 524, and thus the fourth user interface 514, populated with the spreadsheet 524, may be actively executing in a foreground visible to the user. A search input interface 504 may be displayed through the computing device 502.

FIG. 5B illustrates the user submitting a search query 530 "Sports Car Z" into the search input interface 504. It may be appreciated that the user may input the search query 530 through various input techniques such as through a voice command. Accordingly, a multi user interface search may be performed using the search query 530 "Sports Car Z". For example, the first set of emails 518 of the first user interface 508, the social network posts 520 of the second user interface 510, the text document 522 of the third user interface 512, the spreadsheet 524 of the fourth user interface 514, and/or the second set of emails 526 within the fifth user interface 516 may be searched using the search query 530 "Sports Car Z" to identify search results. For example, a new car purchase email within the first set of emails 518 of the first user interface 508 and a new car purchase social network post 542 within the social network posts 520 of the second user interface 510 may comprise features (e.g., text, images with features recognized using image feature recognition techniques, etc.) that match the search query 530 "Sports Car Z", and thus are identified as the search results. The search results may be displayed through a search results interface 532 populated with content links. For example, the new car purchase email may be represented by a first content link 534 linking to the new car purchase email within the first set of emails 518 of the first user interface 508. The new car purchase social network post 542 may be represented by a second content link 536 linking to the new car purchase social network post 542 within the social network posts 520 of the second user interface 510. In an example, the first user interface 508 and/or the second user interface 510, but not other user interfaces that do not comprise search results, may be displayed or represented by snapshot images to aid the user in locating search results.

FIG. 5C illustrates the computing environment of the computing device 502 transitioning to the second user interface 510 based upon the user selecting the second content link 536 linking to the new car purchase social network post 542. For example, the computing environment of the computing device 502 may be transitioned to display the second user interface 510 within a foreground, and a focus point of the second user interface 510 (e.g., a visual center position or other prominently visible position) may be anchored to the new car purchase social network post 542 (e.g., the new car purchase social network post 542 may be displayed in a visually centered position within the second user interface 510, as opposed to scrolled out of view or some other obstructed view position). In an example, a display property of the new car purchase social network post 542 may be modified, such as highlighted or bolded, to visually distinguish the new car purchase social network post 542 as a search result. A return to search result interface link 540 may be provided to link the user back to the search results interface 532.

Figure 6A:
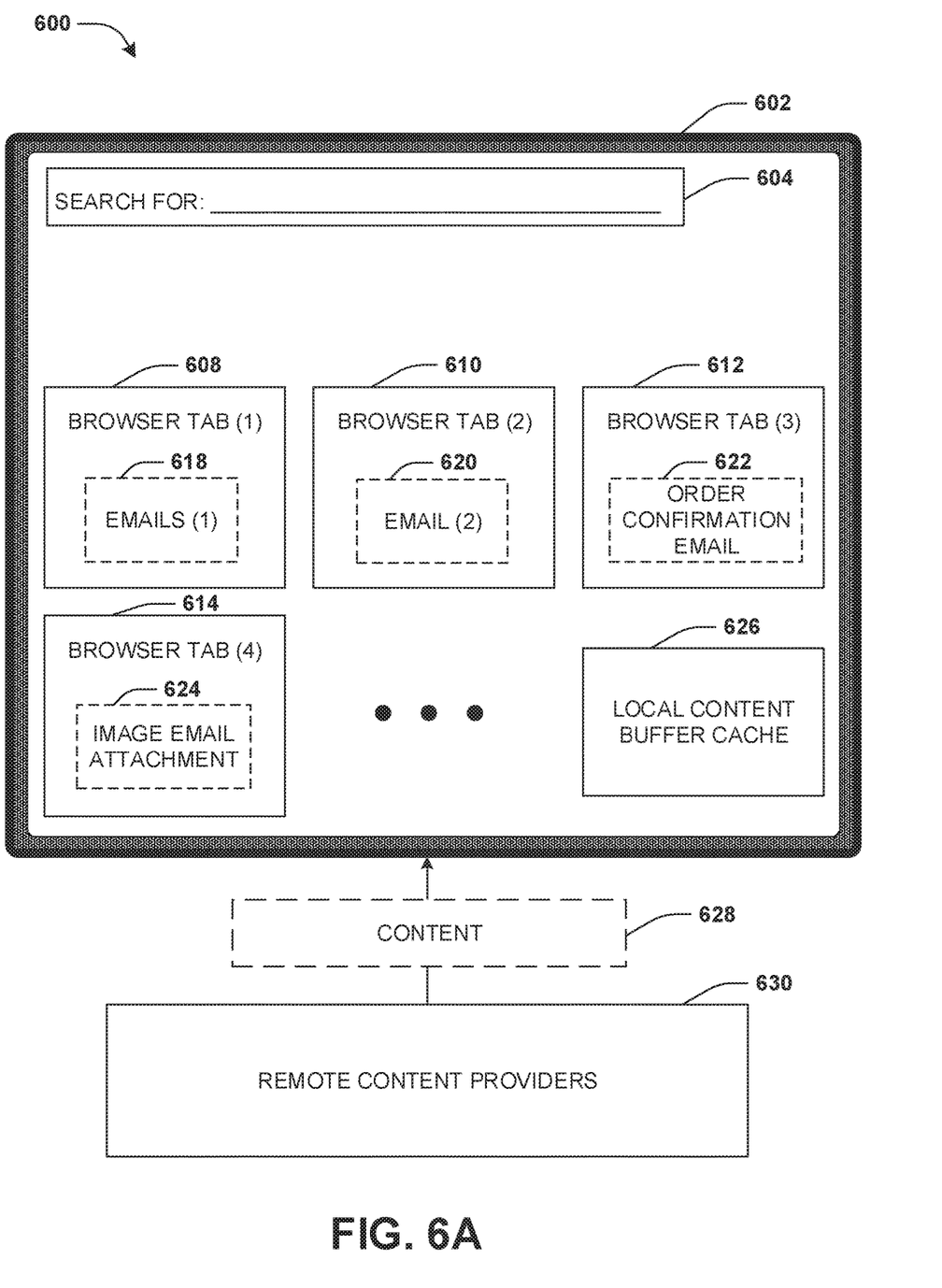
FIG. 6A is a component block diagram illustrating an example system for searching across multiple user interfaces, where a browser computing environment hosts a plurality of browser tab user interfaces.
Figure 6B:
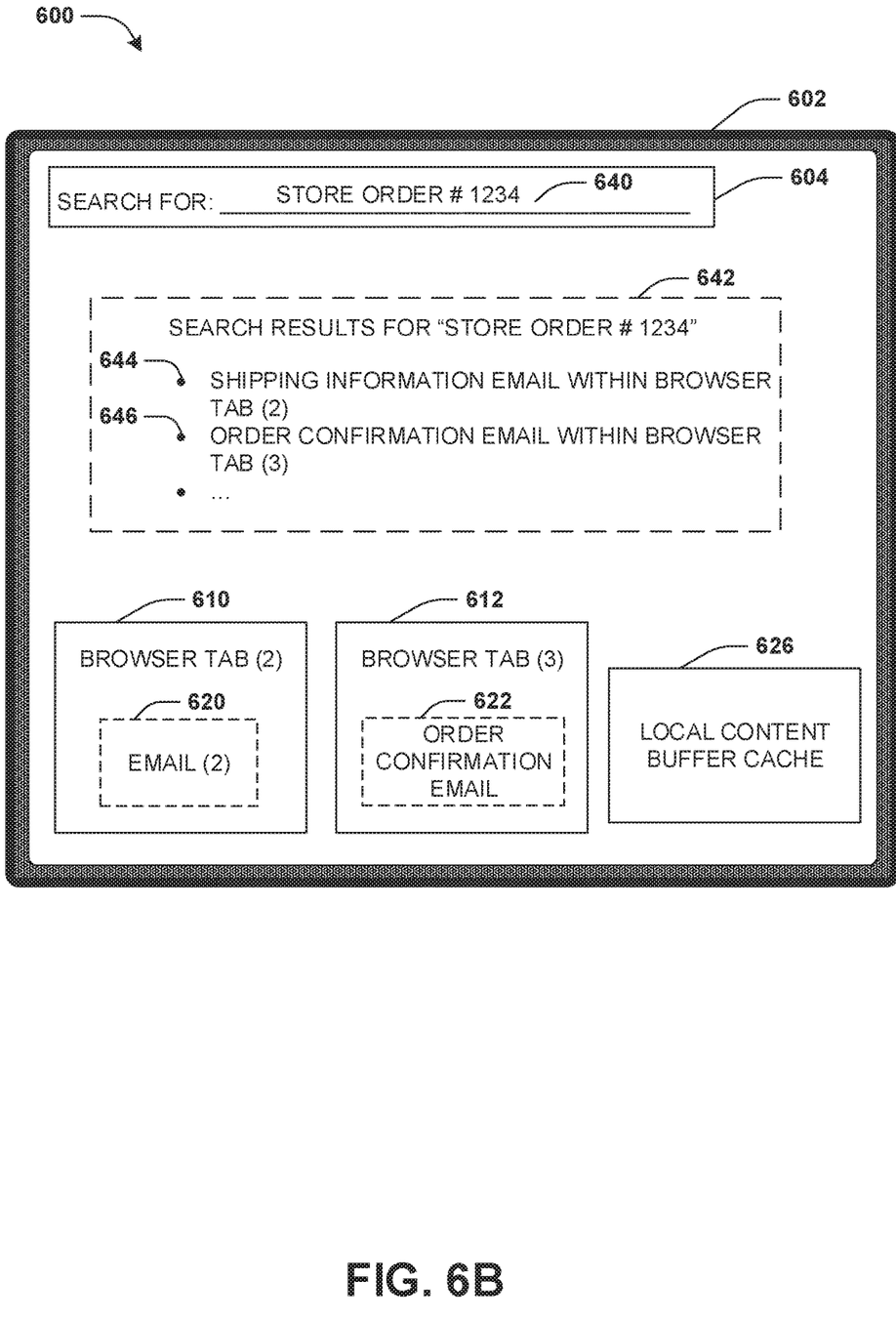
FIG. 6B is a component block diagram illustrating an example system for searching across multiple user interfaces, where search results are provided.

FIGS. 6A-6B illustrate examples of a system 600 for searching across multiple user interfaces. FIG. 6A illustrates a computing device 602 hosting a browser computing environment comprising one or more browser tab user interfaces comprising content 628 received from one or more remote content providers 630. The browser computing environment may host a first browser tab user interface 608 populated with a first set of emails 618, a second browser tab user interface 610 populated with a second set of emails 620, a third browser tab user interface 612 populated with an order confirmation email 622, and a fourth browser tab user interface 614 populated with an image email attachment 624. The browser computing environment may locally cache the content 628, such as the order confirmation email 622, the image email attachment 624, and/or recently accessed emails within the first set of emails 618 and the second set of emails 620 within a local content buffer cache 626 (e.g., memory of the computing device 602). In this way, the cached content may be efficiently accessed by the browser computing environment, such as if the one or more remote content providers 630 are inaccessible (e.g., the computing device 602 becomes offline, such as disconnected from a network). A search input interface 604 may be displayed through the computing device 602.

FIG. 6B illustrates the user submitting a search query 640 "Store Order #1234" into the search input interface 604. It may be appreciated that the user may input the search query 640 through various input techniques such as through a voice command. Accordingly, a multi user interface search may be performed using the search query 640 "Store Order #1234". For example, a local content query may be performed, using the search query 640 "Store Order #1234", against the cached content within the local content buffer cache 626 to identify search results. Because the browser computing environment may merely cache recently access emails and/or other content within the local content buffer cache 626, the search results may be relatively more relevant to the user than stale emails and/or other content that has not been recently accessed (e.g., the user may want to check a shipping status of a recent purchase, and thus emails from months ago may be less relevant than recently accessed emails). In an example, a shipping information email, cached within the local content buffer cache 626, of the second set of emails 620 within the second browser tab user interface 610 may be identified as a first search result matching the search query 640 "Store Order #1234". The order confirmation email 622, cached within the local content buffer cache 626, within the third browser tab user interface 612 may be identified as a second search result matching the search query 640 "Store Order #1234".

The search results may be displayed through a search results interface 642 populated with content links. For example, the shipping information email may be represented by a first content link 644 linking to the shipping information email within the second set of emails 620 of the second browser tab user interface 610. The order confirmation email 622 may be represented by a second content link 646 linking to the order confirmation email 622 within the third browser tab user interface 612. In an example, the second browser tab user interface 610 and/or the third browser tab user interface 612, but not other user interfaces that do not comprise search results, may be displayed or represented by snapshot images to aid the user in locating search results.

Figure 7:
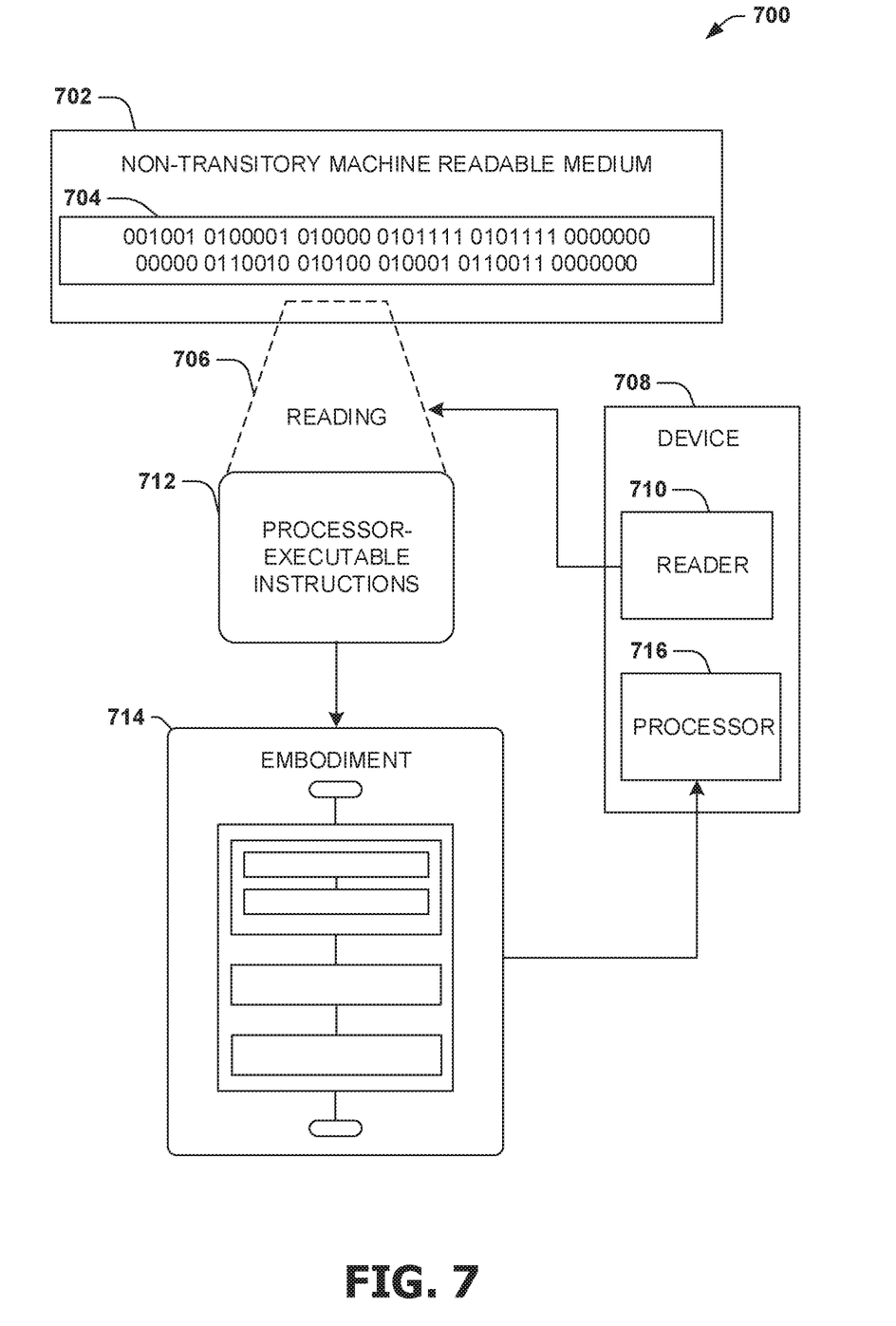
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4, for example. In some embodiments, the processor-executable instructions 712 are configured to cause implementation of a system, such as at least some of the example system 500 of FIGS. 5A-5C and/or at least some of the example system 600 of FIGS. 6A-6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving a search query from a user of a computing environment hosting a plurality of mobile app user interfaces populated with content;
   identifying the plurality of mobile app user interfaces as being currently populated with the content;
   executing a query using the search query to identify search results for the search query from content within the plurality of mobile app user interfaces that correspond to the search query; and
   providing the search results, identifying matching content populated within the plurality of mobile app user interfaces, to the user, wherein the search results comprise a first search result indicative of first matching content from a first mobile app user interface of the plurality of mobile app user interfaces and a second search result indicative of second matching content from a second mobile app user interface of the plurality of mobile app user interfaces.

2. The method of claim 1, wherein the executing comprises:
   querying first content populated within a third mobile app user interface using the search query to determine whether the first content is a third search result corresponding to the search query; and
   querying second content populated within a fourth mobile app user interface using the search query to determine whether the second content is a fourth search result corresponding to the search query.

3. The method of claim 1, wherein the executing comprises:
   querying a local content buffer cache to identify a set of cached content eligible for being queried; and
   querying the set of cached content using the search query to identify the search results.

4. The method of claim 3, wherein the executing comprises:
   performing an offline query to the local content buffer cache.

5. The method of claim 1, wherein the content is provided from a remote content provider to a local device hosting the computing environment, and wherein the executing comprises:
   performing a local content query of the content stored within the local device without accessing the remote content provider.

6. The method of claim 5, wherein the performing a local content query comprises:
   performing the local content query while the remote content provider is inaccessible to the computing environment.

7. The method of claim 1, comprising:
   querying a first browser tab user interface comprising first browser content and a second browser tab user interface comprising second browser content using the search query to identify the search results.

8. The method of claim 1, comprising:
   querying a first email user interface comprising a first set of emails and a second email user interface comprising a second set of emails.

9. The method of claim 1, wherein the providing the search results comprises:
   displaying a search result interface populated with content links to one or more search results.

10. The method of claim 9, comprising:
    responsive to the user selecting a content link, transitioning the computing environment to a user interface comprising content linked to by the content link.

11. The method of claim 10, wherein the transitioning the computing environment comprises:
    anchoring a focus point upon a portion of the content matching the search query.

12. The method of claim 1, wherein the providing the search results comprises:
    modifying a display property of a portion of content matching the search query.

13. The method of claim 10, comprising:
    responsive to transitioning to the user interface, displaying a return to search result interface link.

14. The method of claim 1, wherein the providing the search results comprises:
    identifying a subset of mobile app user interfaces of the plurality of mobile app user interfaces comprising content corresponding to the search query.

15. The method of claim 14, wherein the providing the search results comprises:
    displaying the subset of mobile app user interfaces but not a second subset of the plurality of mobile app user interfaces not comprising content corresponding to the search query.

16. A computing device comprising:
    a processor; and
    memory comprising processor-executable instructions that when executed by the processor cause performance of operations, the operations comprising:
      receiving a search query from a user of a computing environment hosting a plurality of mobile app user interfaces populated with content;
      identifying the plurality of mobile app user interfaces as being currently populated with the content;
      executing a query to identify search results of the search query from content within the plurality of mobile app user interfaces that correspond to the search query; and
      providing the search results, identifying matching content populated within the plurality of mobile app user interfaces, to the user, wherein the search results comprise a first search result indicative of first matching content from a first mobile app user interface of the plurality of mobile app user interfaces and a second search result indicative of second matching content from a second mobile app user interface of the plurality of mobile app user interfaces.

17. The computing device of claim 16, wherein the operations comprise:
    querying a local content buffer cache to identify a set of cached content eligible for being queried; and querying the set of cached content using the search query to identify the search results.

18. The computing device of claim 17, wherein the operations comprise:
performing an offline query to the local content buffer cache.

19. The computing device of claim 16, wherein the operations comprise:
displaying a search result interface populated with a first content link to third content within a third mobile app user interface and a second content link to fourth content within a fourth mobile app user interface based upon the third content and the fourth content being associated with one or more search results of the search query.

20. A non-transitory machine readable medium having stored thereon processor-executable instructions that when executed cause performance of operations, the operations comprising:

receiving a search query from a user of a computing environment hosting a plurality of mobile app user interfaces populated with content;
identifying the plurality of mobile app user interfaces as being currently populated with the content;
executing a query using the search query to identify search results for the search query from content within the plurality of mobile app user interfaces that correspond to the search query; and
providing the search results, identifying matching content populated within the plurality of mobile app user interfaces, to the user, wherein the search results comprise a first search result indicative of first matching content from a first mobile app user interface of the plurality of mobile app user interfaces and a second search result indicative of second matching content from a second mobile app user interface of the plurality of mobile app user interfaces.

\* \* \* \* \*